3,067,219
6-CHLORO DERIVATIVES OF Δ⁴-PREGNEN-17α,21-DIOL-3,20-DIONE AND Δ¹,⁴-PREGNADIENE-17α, 21-DIOL-3,20-DIONE

Howard J. Ringold and Octavio Mancera, Mexico City, Mexico, assignors, by mesne assignments, to Syntex Corporation, a corporation of Panama
No Drawing. Filed Aug. 29, 1958, Ser. No. 757,930
Claims priority, application Mexico Aug. 30, 1957
14 Claims. (Cl. 260—397.47)

The present invention relates to novel cyclopentanophenanthrene compounds.

More particularly the present invention relates to 6-chloro derivatives of Δ⁴-pregnen-17α,21-diol-3,20-dione and Δ¹,⁴-pregnadien-17α,21-diol-3,20-dione, the 21-esters of these compounds of hydrocarbon carboxylic acids of less than 12 carbon atoms, and the 17α,21-diesters of these compounds of hydrocarbon carboxylic acids of less than 12 carbon atoms. Within the foregoing definition the 6β-chloro compounds to be hereinafter set forth in detail are intermediates for the production of the corresponding 6α-chloro compounds. The 6α-chloro compounds above set forth are intermediates for the production of the active cortical hormones, 6α-chloro cortisone and hydrocortisone by well known methods involving the microbiological introduction of an 11β- or 11α-hydroxy group followed (for 6α-chloro cortisone) by oxidation to an 11-keto group. In addition the 17α,21-diesters of the 6α-chloro compounds above set forth are valuable progestational hormones.

In accordance with the present invention it has been discovered that 5α,6α-epoxide derivatives of pregnane-17α,21-diol-20-one having in the C–3 position a ketal or alcohol group upon reaction with hydrogen chloride gave a corresponding 6-chloro derivative. As will be hereinafter set forth depending on reaction conditions these derivatives were either 6β-chloro or 6α-chloro compounds.

The novel compounds of the present invention are illustrated in the following formulas:

In the above formulas R represents hydrogen or a hydrocarbon carboxylic acid ester group of less than 12 carbon atoms. These ester groups may be saturated or unsaturated, of straight or branched chain, cyclic or mixed cyclic-aliphatic, unsubstituted or substituted conventionally as with methoxy or halogen. Examples of such ester groups include acetate, propionate, cyclopentylpropionate, benzoate, butyrate, etc. $R_1$ represents hydrogen or a hydrocarbon carboxylic acid ester group of les than 12 carbon atoms when R represents a hydrocarbon carboxylic acid ester group of less than 12 carbon atoms and $R_1$ represents hydrogen when R is hydrogen. X represents a double bond between C–1 and C–2 or a saturated linkage between C–1 and C–2.

The novel compounds of the present invention are prepared by a process illustrated by the following equations:

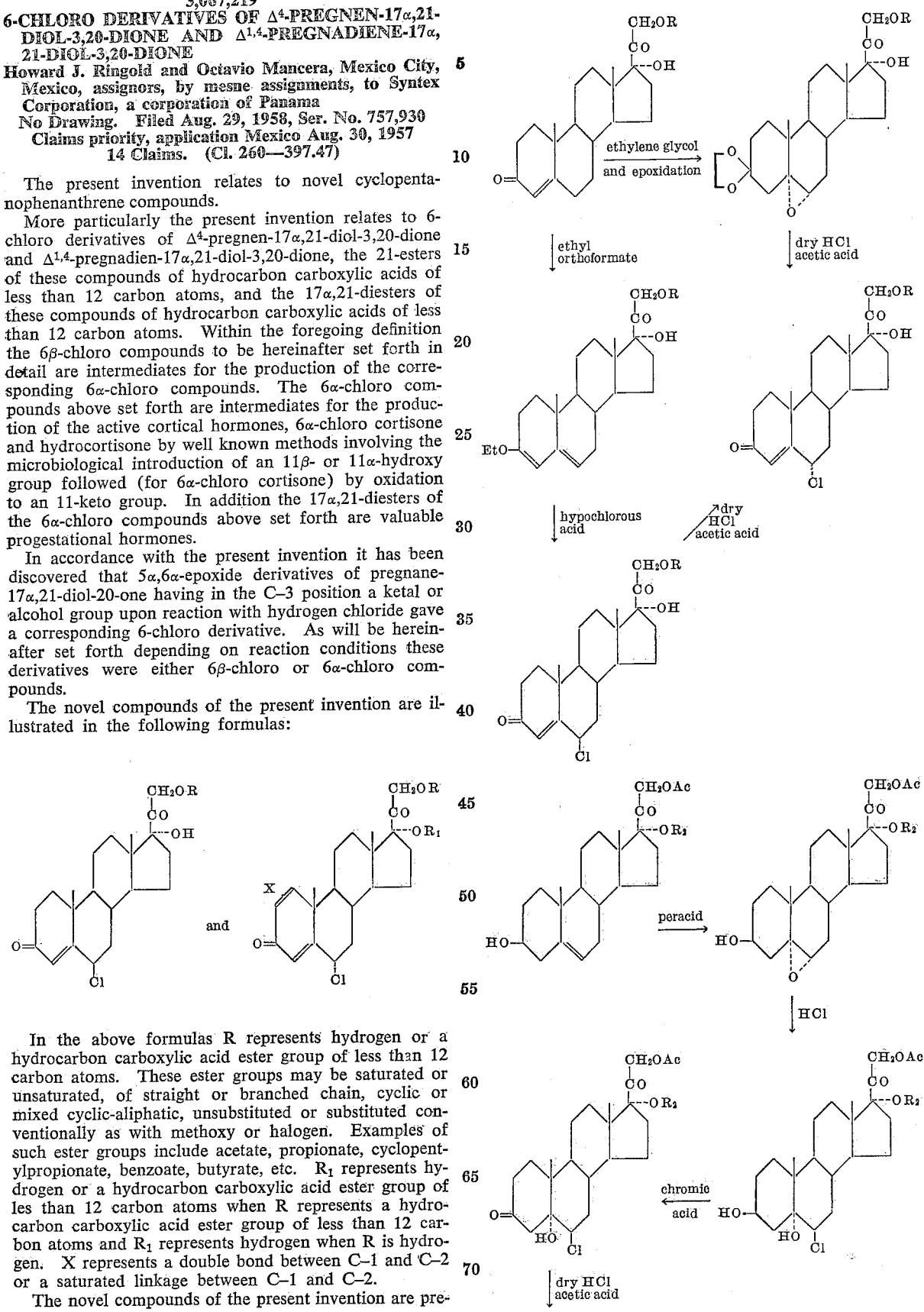

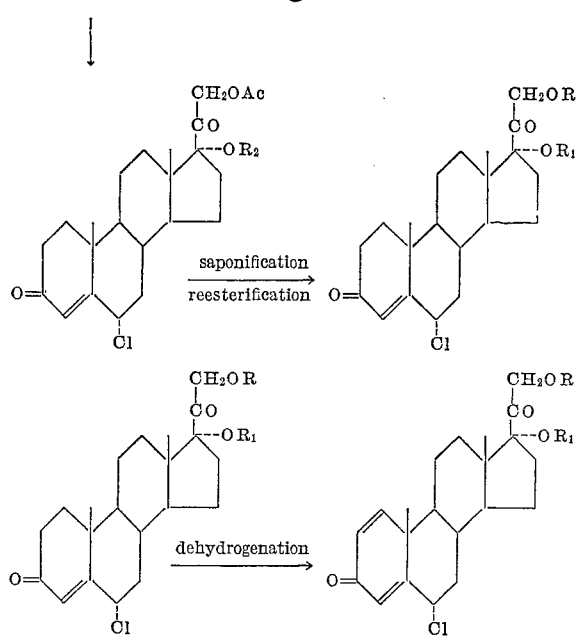

In the above equations R and $R_1$ represent the same groups as heretofore set forth. Ac represents acetate. Et represents ethyl. $R_2$ represents hydrogen or acetate.

Referring to the first of the above equations Reichsteins substance "S" 21-acetate ($\Delta^4$-pregnen-17α,21-diol-3,20-dione 21-acetate) is conventionally converted as known in the art to 3-ethylenedioxy-5α,6α-oxido-pregnan-17α,21-diol-20-one 21-acetate or to the 21-acetate of 3-ethoxy-$\Delta^{3,5}$-pregnadien-17α,21-diol-20-one, by reaction with ethylene glycol followed by epoxidation with a per acid, or by reaction with ethyl orthoformate. Reaction of the 21-acetate of 3-ethylenedioxy-5α,6α-oxido-pregnan-17α,21-diol-20-one with dry HCl in acetic acid gave the 21-acetate of 6α-chloro-$\Delta^4$-pregnan-17α,21-diol-20-one. If another ester of substance S is used as the starting material of the character set forth previously the final product is the corresponding ester. As indicated the same compounds may also be prepared from the 21-acetate or other ester of 3-ethoxy-$\Delta^{3,5}$-pregnadien-17α,21-diol-20-one by reacting these compounds with hypochlorous acid. The hypochlorous acid for the reaction is obtained in situ as by treatment with n-chlorosuccinimide in acetone solution in the presence of sodium acetate and acetic acid. In place of the n-chlorosuccinimide other N-chloro-imides or N-chloro-amides may be used such as N-chloroacetamide or N-chloro-benzenesulfonamide. Alkali metal or alkaline earth metal hypochlorites may also be used such as sodium or calcium hypochlorite. The compounds obtained after this last step are the coresponding 21-esters of 6β-chloro-$\Delta^4$-pregnen-17α,21-diol-3,20-dione. These compounds are then converted to the corresponding 6α-chloro compounds by treatment with dry HCl in acetic acid.

In the second equation above the starting material is a 21-acetate or a 17,21-diacetate of $\Delta^5$-pregnen-3β,17α,21-triol-20-one. Treatment of these compounds with a peracid such as monoperphthalic acid gave the coresponding 5α,6α-oxido compounds. Treatment of these oxido compounds with hydrogen chloride in chloroform gave the corresponding acetates of 6β-chloro-pregnan-3β,5α,17α,21-tetrol-20-one. Upon treating these tetrols with chromic acid the 3β-hydroxy group was oxidized to a 3-keto group to give the 21-acetate or 17,21-diacetate of 6β-chloro-pregnan-5α,17α,21-triol-20-one. Treatment of these last compounds with dry hydrogen chloride in acetic acid dehydrated the compounds and inverted the 6β-chloro to 6α-chloro to give the 21-acetate or 17,21-diacetate of 6α-chloro-$\Delta^4$-pregnen-17α,21-diol-3,20-dione. Both these acetates and the 21-esters of 6α-chloro-$\Delta^4$-pregnen-17α,21-diol-3,20-dione, previously described, upon conventional mild saponification as by reaction with sodium methoxide at a low temperature gave the corresponding free compound. The free compound was then reesterified either to form the 21-monoesters previously described or 17,21-diesters having the same or different ester groups. To form the 21-monoesters the free 6α-chloro-$\Delta^4$-pregnen-17α,21-diol-3,20-dione was reacted with a corresponding acid anhydride in pyridine in a conventional manner. To obtain the 17,21-diesters the same compound is reacted under acid conditions either at room temperature for a prolonged period or under reflux. The acid condition may be produced by an excess of anhydride or by p-toluenesulfonic acid for example. To form a 17,21-mixed diester the 21-mono-esters are further esterified with a different acid anhydride under conditions as set forth for 17,21-diester formation.

As indicated in the third equation above the 21-monoesters or 17,20-diesters of 6α-chloro-$\Delta^4$-pregnen-17α,21-diol-3,20-dione are dehydrogenated to the corresponding $\Delta^{1,4}$-compounds. For this reaction the preferred agent is selenium dioxide in the presence of tertiary butanol and pyridine. The same dehydrogenation may however be performed by known microbiological methods. The esters of 6α-chloro-$\Delta^{1,4}$-pregnadien-17α,21-diol-3,20-dione are transformed to the free compound by conventional saponification.

The following specific examples serve to illustrate the present invention but are not intended to limit the same.

*Example I*

5 g. of the 21-acetate of 3-ethylenedioxy-5α,6α-oxido-pregnan-17α,21-diol-20-one was dissolved in 250 cc. of glacial acetic acid and a slow stream of dry hydrogen chloride was introduced into the solution, for a period of 2 hours, maintaining the temperature of the mixture below 18° C. It was then poured into ice water and the reaction product was extracted with methylene dichloride, washed with 5% sodium carbonate solution and water to neutral, dried over anhydrous sodium sulfate, filtered and evaporated to dryness. Crystallization of the residue from acetone-hexane afforded the 21-acetate of 6α-chloro-$\Delta^4$-pregnen-17α,21-diol-3,20-dione with M.P. 185–186° C., $[\alpha]_D$+99.5° (chloroform), λ max., 238 mμ (log E 4.17).

*Example II*

When in the previous example the 21-acetate of 3-ethylenedioxy-5α,6α-oxido-pregnene-17α,21-diol-20-one was substituted by the 21-acetate of 3-propylenedioxy-5α,6α-oxido-pregnan-17α,21-diol-20-one, there was also obtained the 21-acetate of 6α-chloro-$\Delta^4$-pregnen-17α,21-diol-3,20-dione, identical to the final compound obtained by the method of Example I.

*Example III*

A mixture of 2 g. of the 21-acteate of 3-ethoxy-$\Delta^{3,5}$-pregnadien-17α,21-diol-20-one, 40 cc. of acetone, 8 cc. of water and 800 mg. of sodium acetate was cooled to 0° C. and treated with 800 mg. of N-chlorosuccinimide and then with 0.8 cc. of glacial acetic acid. The mixture was stirred for 1 hour at 0° C. and then poured into water; the precipitate was collected, dried and recrystallized from ether, thus yielding the crude 21-acetate of 6β-chloro-$\Delta^4$-pregnen-17α,21-diol-3,20-dione which was purified by recrystallization from acetone-hexane; M.P. 193–194° C., λ max. 240 mμ, log E 4.15, $[\alpha]_D$+4.13° (chloroform).

*Example IV*

In the previous example N-chlorosuccinimide was substituted by N-chloroacetamide with the same final result.

*Example V*

In the methods of Examples III and IV, the 21-acetate of 3-ethoxy-$\Delta^{3,5}$-pregnadien-17α,21-diol-20-one was substituted by the 21-acetate of 3-methoxy-$\Delta^{3,5}$-pregnadien-17α,21-diol-20-one with the same final result.

Example VI 1 g. of the 21-acetate of 6β-chloro-Δ⁴-pregnen-17α-21-diol-3,20-dione obtained by any of the methods of Examples III to V, was dissolved in 50 cc. of glacial acetic acid and a slow stream of dry hydrogen chloride was introduced into the solution for 2 hours maintaining the temperature below 18° C. The reaction product was worked up as described in Example I. There was thus obtained the 21-acetate of 6α-chloro-Δ⁴-pregnen-17α,21-diol-3,20-dione, identical to that obtained in such example.

Example VII

A suspension of 1 g. of the 21-acetate of 6α-chloro-Δ⁴-pregnen-17α-21-diol-3,20-dione in 10 cc. of absolute methanol was cooled to 0° C. and mixed under nitrogen with a cooled solution of sodium methoxide prepared by dissolving approximately 60 mg. of sodium in 5 cc. of absolute methanol. The mixture was stirred under nitrogen for 1 hour and then poured into a cooled saturated aqueous solution of sodium chloride containing 0.3 cc. of glacial acetic acid. The precipitate was collected, washed with water, dried and crystallized from acetone-hexane, thus giving 6α-chloro-Δ⁴-pregnen-17α,21-diol-3,20-dione.

Example VIII

By the same method of the previous example, the 21-acetates of 6β-chloro-Δ⁴-pregnen-17α,21-diol-3,20-dione was converted into the free 6β-chloro-Δ⁴-pregnen-17α,21-diol-3,20-dione.

Example IX

A mixture of 1 g. of 6β-chloro-Δ⁴-pregnen-17α,21-diol-3,20-dione, 10 cc. of pyridine and 1 cc. of propionic anhydride was kept overnight at room temperature and poured into water. The mixture was heated on the steam bath for half an hour, cooled and the precipitate was collected. Recrystallization from acetone-hexane yielded the 21-propionate of 6β-chloro-Δ⁴-pregnen-17α,21-diol-3,20-dione.

Similarly, there was prepared the 21-propionate of 6α-chloro-Δ⁴-pregnen-17α,21-diol-3,20-dione. When propionic anhydride was substituted by the anhydride or chloride of another hydrocarbon carboxylic acid, of up to 12 carbon atoms, there were obtained the corresponding 21-esters. Specifically there were obtained in this way the 21-cyclopentylpropionate and the 21-benzoate.

Example X

A solution of 5 g. of the 21-acetate of Δ⁵-pregnen-3β,17α,21-triol-20-one in 100 cc. of chloroform was mixed with 1.5 molar equivalents of monoperphthalic acid in ether solution and the mixture was kept at room temperature for 20 hours. It was then diluted with water and the organic layer was separated and washed with water, sodium bicarbonate solution and again with water to neutral, dried over anhydrous sodium sulfate and evaporated to dryness under reduced pressure. The residue crystallized from acetone-hexane to give the 21-acetate of 5α,6α-oxido-pregnan-3β,17α,21-triol-20-one.

3 g. of the 21-acetate of 5α,6α-oxido-pregnan-3β,17α,21-triol-3,20-dione was dissolved in 100 cc. of chloroform, cooled to 0° C. and then a slow stream of dry hydrogen chloride was allowed to pass into the solution for 2 hours while the temperature was maintained below 10° C. The mixture was diluted with water and the chloroform layer was washed with water, dried over anhydrous sodium sulfate and evaporated to dryness. Crystallization of the residue from acetone furnished the 21-acetate of 6β-chloro-pregnan-3β,5α,17α,21-tetrol-20-one.

A solution of 3 g. of the acetate of 6β-chloro-pregnan-3β,5α,17α,21-tetrol-20-one in 150 cc. of acetone was cooled to 0° C. and mixed with an 8N solution of chromic acid prepared by mixing 1.7 g. of chromic acid with concentrated sulfuric acid and water. The reagent was added dropwise with stirring and keeping the temperature below 0° C. The stirring was continued for 1 hour at 0° C. and then the mixture was diluted with water and extracted with ether. The extract was washed, dried over anhydrous sodium sulfate, filtered and evaporated to dryness. Recrystallization of the residue from acetone yielded the 21-acetate of 6β-chloro-pregnan-5α,17α,21-triol-3,20-dione.

2 g. of the 21-acetate of 6β-chloro-pregnan-5α,17α,21-triol-3,20-dione was dissolved in 80 cc. of glacial acetic acid and a slow stream of dry hydrogen chloride was passed into the solution for 2 hours at a temperature around 18° C. The mixture was diluted with water and the product was extracted with ethyl acetate, washed with water, 5% sodium carbonate solution and water, dried over anhydrous sodium sulfate and evaporated to dryness. Crystallization of the residue from acetone-hexane afforded the 21-acetate of 6α-chloro-Δ⁴-pregnen-17α,21-diol-3,20-dione, identical with the compound of Example I.

Example XI

A suspension of 3 g. of the 21-acetate of 5α,6α-oxido-pregnan-3β,17α,21-triol-20-one in 200 cc. of acetone was mixed with 10 cc. of concentrated hydrochloric acid and stirred for one and a half hours. It was then poured into saturated aqueous sodium chloride solution and extracted with three portions of methylene dichloride. The extract was washed with 5% sodium carbonate solution and then with water, dried over anhydrous sodium sulfate and concentrated to 30 cc. The mixture was cooled and the crystalline precipitate was collected, thus giving the 21-acetate of 6β-chloro-pregnan-3β,5α,17α,21-tetrol-20-one, identical with the compound obtained by the method of Example X.

Example XII 3 g. of the 21-acetate of 6β-chloro-pregnan-3β,5α,17α,21-tetrol-20-one dissolved in 100 cc. of acetic acid was mixed with 950 mg. of chromic acid previously dissolved in 20 cc. of 80% acetic acid. The reagent was added dropwise to the stirred solution which was kept at a temperature below 15° C. The stirring was continued for 2 hours at 15° C. and the mixture was then diluted with water and the precipitate formed was collected, washed with water, dried and recrystallized from acetone-hexane, thus yielding the 21-acetate of 6β-chloro-pregnan-5α,17α,21-triol-3,20-dione, identical with the compound obtained by the method of Example X.

Example XIII

By the methods of Examples X to XII, the 17,21-diacetate of Δ⁵-pregnen-3β,17α,21-triol-20-one was converted into the 17,21-diacetate of 5α,6α-oxido-pregnan-3α,17α,21-triol-20-one, then into the 17,21-diacetate of 6β-chloro-pregnan-3β,5α,17α,21-tetrol-20-one and then into that of 6β-chloro-pregnan-5α,17α,21-triol-3,20-dione. The final product was the diacetate of 6α-chloro-Δ⁴-pregnen-17a,21-diol-3,20-dione.

Example XIV

A suspension of 1 g. of the diacetate of 6α-chloro-Δ⁴-pregnen-17α,21-diol-3,20-dione in 10 cc. of absolute methanol was cooled to 0° C. and mixed with a solution of sodium methoxide prepared by dissolving 120 mg. of sodium metal in 10 cc. of absolute methanol; the addition was effected with stirring under an atmosphere of nitrogen. The stirring was continued under nitrogen for 1 hour at 0° C. and the mixture was then poured into 60 cc. of cold saturated aqueous sodium chloride solution containing 0.3 cc. of acetic acid. The precipitate formed was collected, washed with water, dried and recrystallized from acetone-hexane. There was thus obtained the free 6α-chloro-Δ⁴-pregnen-17α,21-diol-3,20-dione, identical with the compound of Example I.

Example XV

A solution of 1 g. of 6α-chloro-Δ⁴-pregnen-17α,21-diol-3,20-dione in 50 cc. of anhydrous benzene was treated with 4 cc. of propionic anhydride and 300 mg. of p-toluenesulfonic acid and the mixture was kept standing at room temperature for 40 hours. It was then diluted with water and the organic layer was separated, washed with water, aqueous sodium bicarbonate solution and again with water to neutral, dried over anhydrous sodium sulfate and the benzene was evaporated. Crystallization of the residue from acetone-hexane furnished 6α-chloro-Δ⁴-pregnen-17α,21 - diol - 3,20 - dione 17,21-propionate.

Example XVI

By the method of Example XV, 1 g. of the 21-cyclopentylpropionate of 6α-chloro-Δ⁴-pregnen-17α,21 - diol-3,20-dione, in solution in 50 cc. of anhydrous benzene, was treated with 2 cc. of acetic anhydride and 200 mg. of p-toluenesulfonic acid, at room temperature for 24 hours. The acetylation product was worked up as above, thus yield yielding 6α-chloro-Δ⁴-pregnen-17α,21-diol-3,20-dione 17-acetate-21-cyclopentylpropionate.

Example XVII

Following the procedure described in Examples XV and XVI, there were prepared other 17,21-diesters of 6α-chloro-Δ⁴-pregnen-17α,21 - diol - 3,20 - dione, wherein the ester groups were identical or different from each other. By this method there were prepared specifically the 17,21-dibenzoates, the 17,21-diacetates, the 17,21-dicyclopentylpropionates, the 17-acetate, 21-butyrate, etc.

Example XVIII

A mixture of 2 g. of 6α-chloro-Δ⁴-pregnen-17α,21-diol-3,20-dione diacetate, 100 cc. of tertiary butanol, 0.8 g. of recently sublimed selenium dioxide and 0.4 cc. of pyridine was refluxed for 72 hours under an atmosphere of nitrogen. The mixture was filtered, washing the filter with 40 cc. of hot t-butanol, and the combined filtrate and washings was evaporated to dryness under reduced pressure. The residue was dissolved in acetone, treated with decolorizing charcoal and filtered. The acetone was removed and the residue was chromatographed on neutral alumina, thus yielding 6α-chloro-Δ¹,⁴-pregnadien-17α,21-diol13,20-dione diacetate.

Eample XIX

By the method of the previous example, there was dehydrogenated 6α-chloro-Δ⁴-pregnen-17α,21-diol-3,20-dione 17-acetate-21-butyrate to produce 6α - chloro - Δ¹,⁴ - pregnadien-17α,21-diol-3,20-dione 17-acetate-21-butyrate.

Example XX

Following the procedure described in Example XVIII, there was introduced an additional double bond between C–1 and C–2 of other diesters of hydrocarbon carboxylic acids of less than 12 carbon atoms 6α-chloro-Δ⁴-pregnen-17α,21-diol-3,20-dione, which esters were formed with identical radicals or different from each other including the other esters referred to in Example XVII.

Example XXI

By conventional saponification of the esters of 6α-chloro-Δ¹,⁴-pregnadien-17α,21-diol-3,20-dione such as the 17,21-diacetate there was prepared the free 6α-chloro-Δ¹,⁴-pregnadien-17,21-diol-3,20-dione.

We claim:
1. A compound of the following formula:

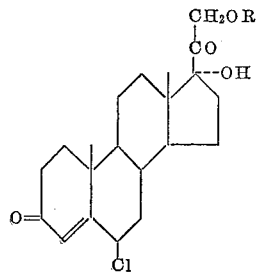

wherein R is selected from the group consisting of hydrogen and a hydrocarbon carboxylic ester group of less than 12 carbon atoms.

2. 6β-chloro-Δ⁴-pregnen-17α,21-diol-3,20-dione.
3. The 21-monoacetate of 6β-chloro-Δ⁴-pregnen-17α,21-diol-3,20-dione.
4. A compound of the following formula:

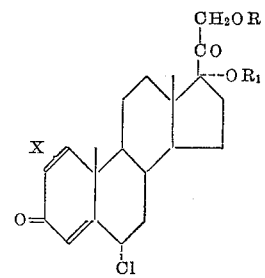

wherein X is selected from the group consisting of a double bond between C–1 and C–2 and a saturated linkage between C–1 and C–2, R is selected from the group consisting of hydrogen and a hydrocarbon carboxylic ester group of less than 12 carbon atoms, $R_1$ is hydrogen when R is hydrogen and $R_1$ is selected from the group consisting of hydrogen and a hydrocarbon carboxylic ester group of less than 12 carbon atoms when R is a hydrocarbon carboxylic ester group of less than 12 carbon atoms.

5. 6α-chloro-Δ⁴-pregnen-17α,21-diol-3,20-dione.
6. The 21-hydrocarbon carboxylic mono esters of less than 12 carbon atoms of 6α-chloro-Δ⁴-pregnen-17α,21-diol-3,20-dione.
7. The 17,21-hydrocarbon carboxylic di esters of less than 12 carbon atoms of 6α-chloro-Δ⁴-pregnen-17α,21-diol-3,20-dione.
8. The 21-monoacetate of 6α-chloro-Δ⁴-pregnen-17α,21-diol-3,20-dione.
9. The 17,21-diacetate of 6α-chloro-Δ⁴-pregnen-17α,21-diol-3,20-dione.
10. 6α-chloro-Δ¹,⁴-pregnadien-17α,21-diol-3,20-dione.
11. The 21-hydrocarbon carboxylic mono esters of less than 12 carbon atoms of 6α-chloro-Δ¹,⁴-pregnadien-17α,21-diol-3,20-dione.
12. The 17,21-hydrocarbon carboxylic di esters of less than 12 carbon atoms of 6α-chloro-Δ¹,⁴-pregnadien-17α,21-diol-3,20-dione.
13. The 21-monoacetate of 6α-chloro-Δ¹,⁴-pregnadien-17α,21-diol 3,20-dione.
14. The 17,21-diacetate of 6α-chloro-Δ¹,⁴-pregnadien-17α,21-diol-3,20-dione.

References Cited in the file of this patent

UNITED STATES PATENTS

| | | |
|---|---|---|
| 2,774,775 | Korman et al. | Dec. 18, 1956 |
| 2,786,855 | Sondheimer et al. | Mar. 26, 1957 |
| 2,837,464 | Nobile | June 3, 1958 |
| 2,838,540 | Campbell et al. | June 10, 1958 |
| 2,862,939 | Dodson et al. | Dec. 2, 1958 |
| 2,865,914 | Schneider et al. | Dec. 23, 1958 |
| 2,934,546 | Ringold et al. | Apr. 26, 1960 |

OTHER REFERENCES

Sondheimer et al.: J. Am. Chem. Soc., vol. 75, Dec. 5, 1953, pp. 5930–593.

Meystre et al.: Helv. Chim. Acta, vol. 39, Section III, 1956, No. 88, pp. 734–42.

Bowers et al.: J. Am. Chem. Soc., vol. 80, Aug 20, 1958, pp. 4423 and 4424.